United States Patent [19]
Glommen

[11] Patent Number: 4,548,417
[45] Date of Patent: Oct. 22, 1985

[54] REVERSIBLE CHUCK

[76] Inventor: Anton L. Glommen, P.O. Box 749, Tiberias 14107, Israel

[21] Appl. No.: 512,227

[22] Filed: Jul. 11, 1983

[51] Int. Cl.$^4$ ............................................. B23B 31/34
[52] U.S. Cl. ........................................ 279/5; 279/114
[58] Field of Search ............ 279/1 DA, 1 DC, 5, 114; 408/35

[56] References Cited

U.S. PATENT DOCUMENTS

| | | | |
|---|---|---|---|
| 779,047 | 1/1905 | Kempster | 279/5 |
| 799,006 | 9/1905 | Kempster | 279/5 |
| 1,721,678 | 7/1929 | Trace | 279/114 X |
| 2,502,260 | 3/1950 | Hunziker | 279/5 |
| 2,588,938 | 3/1952 | Rogers | 279/114 |
| 2,756,061 | 7/1956 | Janik | 279/114 |
| 2,793,043 | 5/1957 | Vermette | 279/114 |
| 2,926,922 | 3/1960 | Vermette | 279/114 |
| 2,930,626 | 3/1960 | Sharp | 279/5 |
| 3,630,536 | 12/1971 | Scharfen | 279/5 |
| 3,790,181 | 2/1974 | Scharfen | 279/4 |
| 3,841,781 | 10/1974 | Mengeringhausen | 408/35 |
| 3,879,045 | 4/1975 | Benjamin et al. | 279/5 |
| 4,209,181 | 6/1980 | Morawski | 279/5 |

FOREIGN PATENT DOCUMENTS 2853467  7/1979  Fed. Rep. of Germany ... 279/1 DC

Primary Examiner—William R. Briggs
Assistant Examiner—Glenn L. Webb
Attorney, Agent, or Firm—Kinney & Lange

[57] ABSTRACT

A chuck for use in lathes and on other work equipment has a jaw carrier that is mounted in a central bore of a chuck housing on a pair of pivot pins and is capable of being indexed or rotated 180° within the chuck housing while a workpiece is held in chuck jaws supported on the jaw housing. The indexing permits performing operations on the opposite ends of the workpiece without unchucking the workpiece from the jaws that are carried on the jaw carrier. The construction of the chuck permits obtaining adequate jaw gripping force and a positive drive between the chuck housing of the workpiece and the indexing jaw carrier. The chuck greatly increases the versatility of machine tools and yet is easily constructed with existing tools itself because it doesn't involve complex interfitting parts.

11 Claims, 7 Drawing Figures

REVERSIBLE CHUCK

BACKGROUND OF THE INVENTION

1. Field of the Invention

The present invention relates to chucks for machine tools or the like which permit indexing the chuck and workpiece 180° to permit machining both ends of the workpiece.

2. Description of the Prior Art

Various indexing chucks have been advanced in the prior art. For example U.S. Pat. No. 3,879,045 issued to Benjamin et al. shows a chuck body using jaws for holding the workpiece that are actuable under fluid pressure, and which can be indexed 180° to permit the opposite ends of the workpiece to be machined without unchucking the workpiece. This patent relates primarily to a position sensor for indicating the position of the jaws during operation.

U.S. Pat. No. 4,209,181 to Morawski shows a chuck that has opposed jaws that can reciprocate toward and away from each other to grip and release a workpiece, and which are rotatable about an axis transverse to the normal machining or turning axis for indexing the chuck to different positions. This is to permit machining holes for projections on the workpiece at various indexed positions.

U.S. Pat. No. 3,790,181 shows a swivel chuck for machining workpieces, and which indexes at 180° relative to the rotational axis of the workpiece during machining which will permit working on both ends of the workpiece, but again this device includes hydraulic chuck actuators, and the rotation of the chuck for indexing, and as disclosed, is accomplished using a gear drive.

U.S. Pat. No. 3,841,781 issued to Mengeringhausen shows an apparatus for the production of connectors for space frameworks, and permits indexing the connectors (workpieces) for machining to various positions about two mutually perpendicular axes, in order to accomplish the necessary machining positions in operation.

U.S. Pat. No. 3,630,536 issued to Scharfen shows a rotatable chuck, especially for lathes, which chucks workpieces and will permit indexing them 180°, and which is controlled by use of a cam arrangement for properly holding the chuck and releasing it at the appropriate times for operation.

An early form of a reversible chuck is shown in U.S. Pat. No. 799,006 issued to Kempster. This particular chuck has a frame that pivots downwardly from a working position to permit indexing the jaw carrier, which carries jaws for chucking the workpiece 180°.

However, none of the devices disclosed in such prior art provide for positive holding of the workpiece, positive drive of the chuck carrier, nor safe reliable operation as with the construction of the present device.

SUMMARY OF THE INVENTION

The present invention relates to a jaw chuck for indexing a workpiece 180° to permit operations to be performed on opposite ends of the workpiece without removing the workpiece from the jaws.

The present device is a very rugged chuck that has a jaw carrier mounted in an outer housing, and wherein the jaws are mechanically operated to grip a workpiece very tightly. A positive mechanical lock is used for holding the jaw carrier in one of two indexed positions rotated 180° from each other, about an axis that is perpendicular to the axis of rotation of the chuck during use. Leaving the workpiece clamped in the jaws and rotating the workpiece 180° when the workpiece requires operations on opposite ends, enhances the accuracy of the machining, because there is no question about getting the workpiece chucked concentric with its prior position. In many instances the finished part can be produced without removing the workpiece from the jaws.

The chuck housing can be mounted to a rotating head, such as on a lathe, in a conventional manner, and the jaw carrier then functions as a reversible indexing chuck during turning operations. The chuck housing can be mounted on a fixed table such as on a milling machine or a drill press, and can perform as a fixed vise allowing the workpiece to be rotated 180° during operations.

Because simple mechanical operations are utilized for clamping workpieces, and for locking the chuck for use, as well as disengaging the locks and indexing the chuck 180°, the chuck assembly lends itself well to automated operations.

The chuck is compact, and the chuck housing provides a very stable support for the jaw carrier. The exterior of the chuck assembly comprises a cover sleeve which is free from any projections or depressions which present a hazard to the operator.

The chuck is easy to make and provides a high degree of accuracy for an indexing chuck that permits rotating the workpiece 180°.

DETAILED DESCRIPTION OF THE PREFERRED EMBODIMENT

Figure 1:
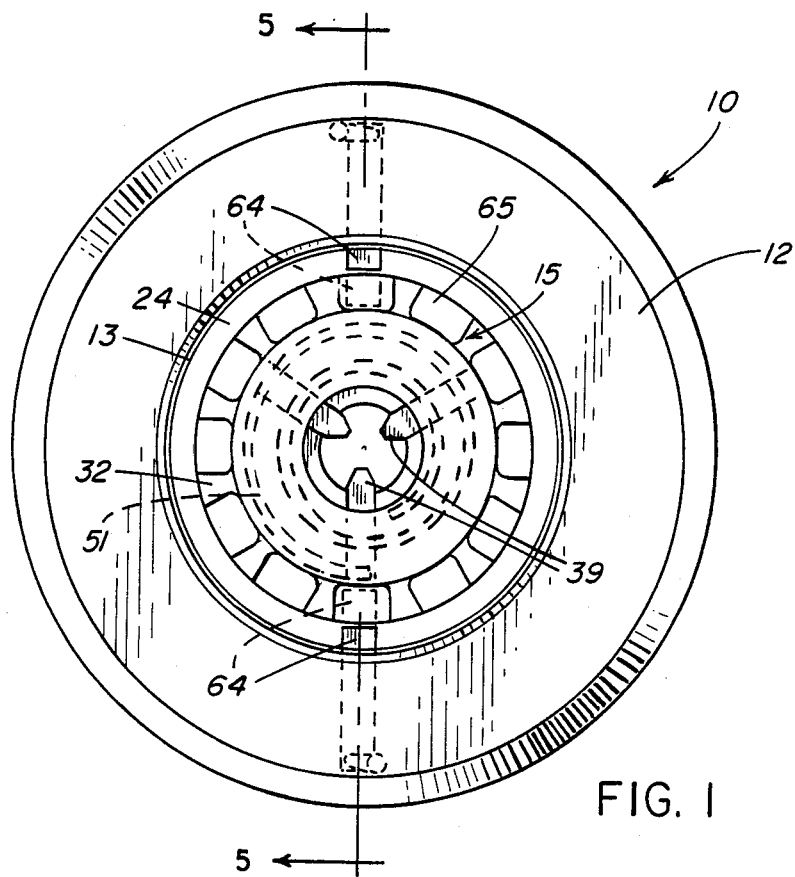
FIG. 1 is a front elevational view of a chuck made according to the present invention.

The chuck indicated generally at 10 of the present invention includes an outer cover sleeve 11 which is an annular sleeve that is fixed to a face plate 12 that is on the front side of the chuck, and which has a central opening indicated generally at 13 on this front side. The sleeve 11 surrounds a chuck housing 14 which is a heavy annular ring housing having a central opening 15, and which fits within and is suitably rotatably mounted relative the sleeve 11 and face plate 12. The opening 15 aligns with the opening 13 in the face plate 12.

Figure 4:
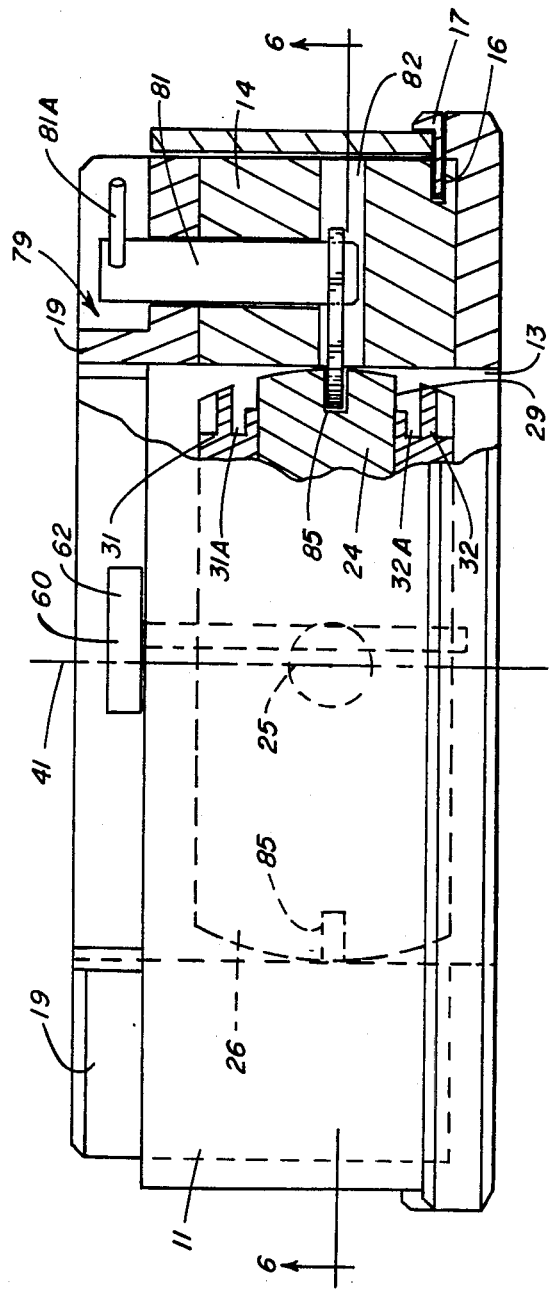
FIG. 4 is a bottom view with parts in section and parts broken away.

The rotatable mounting of the chuck housing may be accomplished in any suitable manner, but as shown in FIG. 4 a groove 16 is machined at the inner end of the housing 14 and guide clips 17 are inserted through provided openings in sleeve 11 and fixed to the front plate 12 to stabilize and hold the chuck housing for rotation. As many clips 17 as needed may be used.

Additionally, an adapter or mounting plate 19 is provided at the rear of the sleeve and is drivably mounted to the rear surface of chuck housing 14, so that the adapter plate 19 will be used for connecting the chuck to the spindle of a lathe, or for fastening the chuck tool table in a desired manner for use.

The chuck housing 14 supports the jaw carrier assembly indicated generally at 23. The jaw carrier assembly 23 as shown includes a jaw carrier member 24 that has a pair of concentric stub shafts 25,25 on diametrically opposite sides thereof. The stub shafts 25 may be separately formed, as shown, and held in place with set screws or pins, or may be integrally machined with the jaw carrier member. The jaw carrier member 24 as shown has a part spherical outer surface indicated at 26, and forms a segment of a sphere with planar, parallel side surfaces indicated generally at 28 and 29, which provide face surfaces against which jaw locking face plates 31 and 32, respectively are rotatably mounted. As shown the jaw locking plates have surfaces which slide on the surfaces 28 and 29, respectively and the plates are retained on the surfaces 28 and 29 for rotation about the axis of the bores 13 and 15.

In the form shown, the jaw locking plates each have annular peripheral grooves 31A and 32A formed on a shoulder adjacent the surfaces 28 and 29. The plates may be retained by providing cap screws 33 threaded into the jaw carrier member 24 and having portions of the cap screw heads riding in the grooves 31A and 32A as shown. The shoulders of the jaw locking plates can have insertion openings to permit installation of the screws 33. Other retiner clips may be used if desired.

Figure 5:
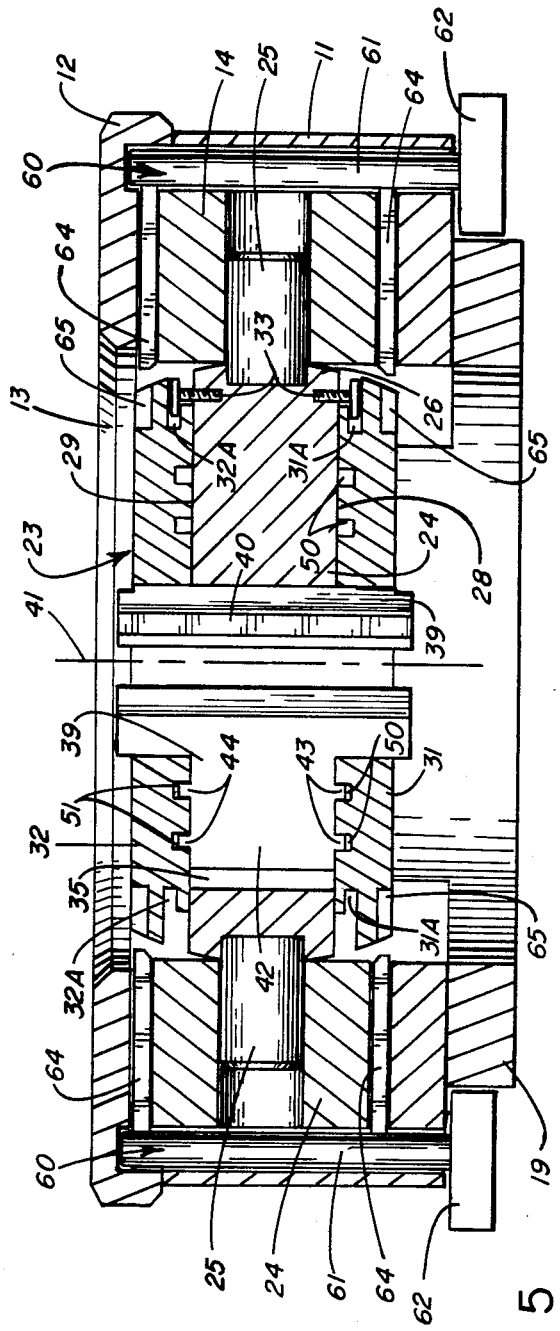
FIG. 5 is a sectional view taken as on line 5—5 in FIG. 1.
Figure 6:
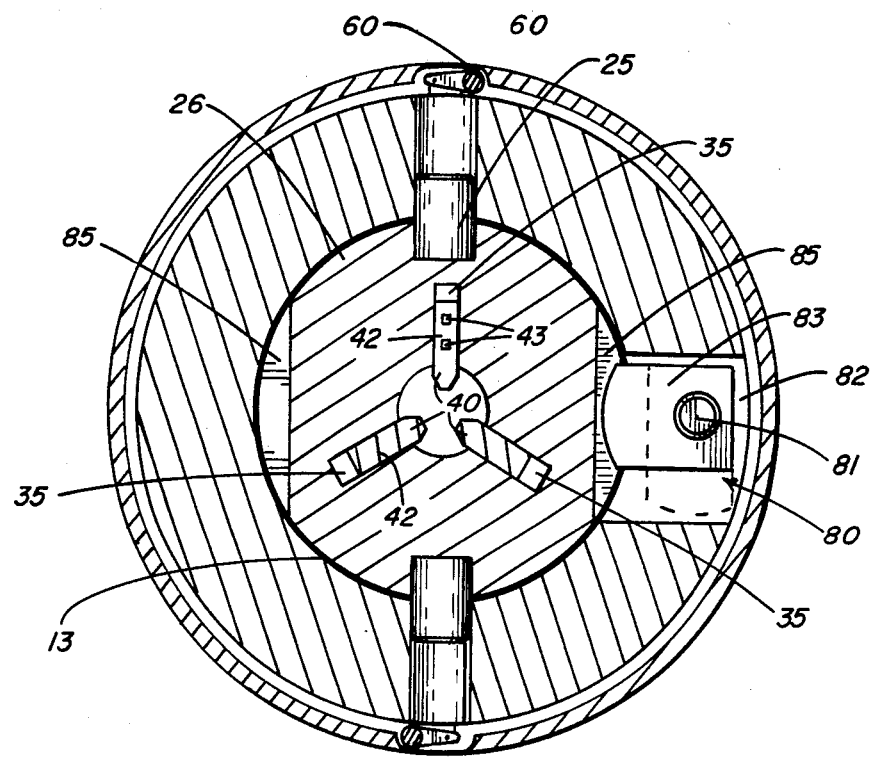
FIG. 6 is a sectional view taken on line 6—6 in FIG. 4.

The jaw carrier member 24 has a plurality (3 as shown) radially extending slots indicated generally at 35 therein, and each of these slots mounts a jaw 39. The jaws 39 have lower workpiece engaging members 40 which are elongated along the central axis 41 of rotation of the chuck, and also have support shank portions 42 that slide in the radial slots 35, and fit closely therein so that they can slide radially relative to the jaw carrier member 24 and the central axis 41. On the end edges of the shanks 42, each of the jaws 39 has a pair of actuator lugs indicated generally at 43 on one side of the jaw 39 (see FIGS. 5 and 6) and at 44 on the opposite side, and these lugs 43 and 44, respectively fit into helical grooves shown at 50, in the actuator plate 31, and at 51 in the actuator plate 32. The helical grooves are shown in dotted lines in FIG. 1. The two lugs of the respective ends of each jaw fit into the respective groove on the jaw locking plates, as shown the two lugs engage the groove at two different locations. When the jaw locking plates are rotated relative to the jaw carrier member 24 the jaws are actuated radially in and out relative to the axis 41 of rotation of the chuck. When the jaw locking plates 31 and 32 rotate or move about the axis 41 relative to the jaw carrier member 24, the helical grooves 50 and 51 will cause the jaws 39 to "screw" in and out relative to the axis 41 and in this way mechanically grip and tighten down onto a workpiece.

Figure 3:
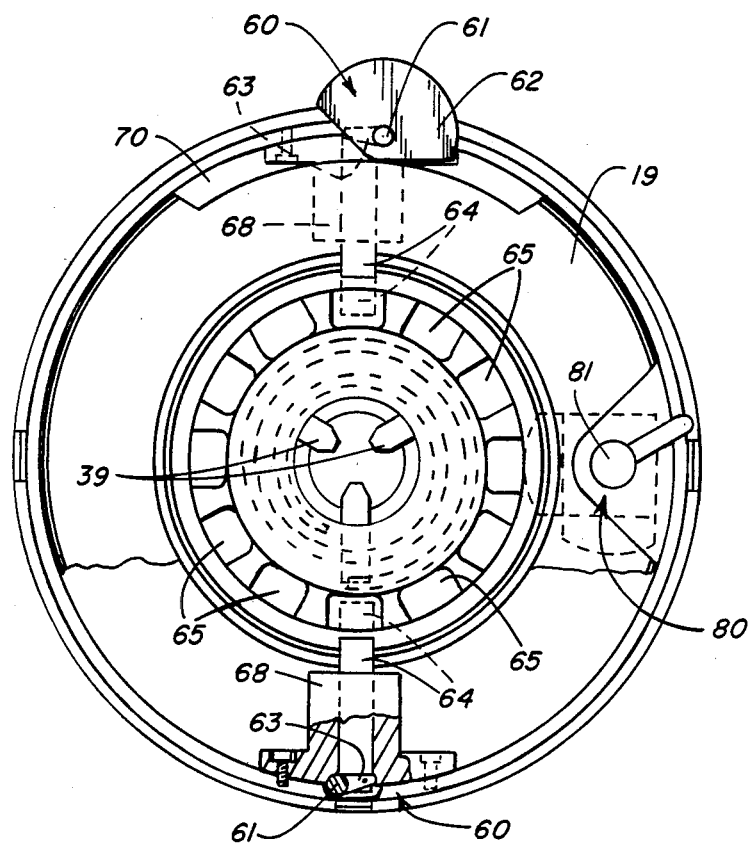
FIG. 3 is a rear elevational view of the chuck of FIG. 1.

In order to turn the jaw locking plates 31 and 32 relative to the jaw carrier member 24 under power, lock pin assemblies indicated generally at 60 are provided at 180° opposite locations, as shown in FIG. 3 in particular. These lock pin assemblies comprise lock actuator shafts 61 that are rotatably mounted relative to the outer sleeve 11, about their longitudinal axes, which are parallel to the axis 41 of rotation. The sleeve 11 has recesses formed to permit the shafts 61 to rotate to the outside of the chuck housing 14. The lock shafts 61 are rotatably supported in openings in face plate 12 and have actuating lugs 62 at the ends thereof on the back face of the chuck. A pair of lock dogs indicated at 64 are mounted onto the opposite ends of each shaft 61 and are positioned so that they are radially aligned with the outer edge portions of the respective jaw locking plates 31 and 32.

Each of the jaw locking plates 31 and 32 has a plurality of receptacles or pockets indicated at 65 which are receptacles that are of size to receive the lock dogs 64. As shown there are a plurality of these receptacles 65 spaced around the periphery of each of the jaw locking plates 31 and 32.

Figure 7:
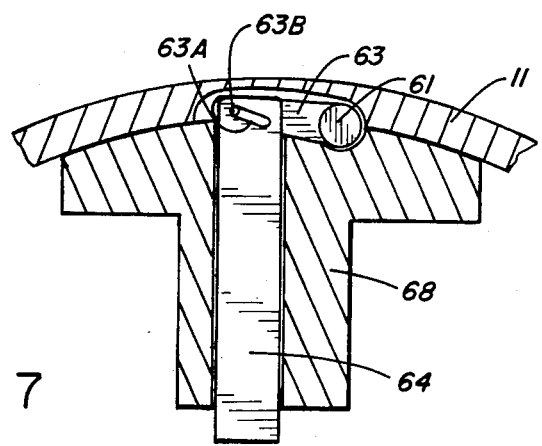
FIG. 7 is a detailed sectional view of supports and operating mechanism for latch dogs used for operating jaw locking plates.

When the jaws 39 are to be actuated onto a workpiece, the lugs 62 are operated to actuate small crank arms indicated at 63 in FIG. 3 for example (see also FIG. 7) which have pins 63A that fit into a slot 63B of the associated lock dog 64 and which will cause the lock dogs 64 to move radially inwardly to a dotted line position as shown in FIG. 1 inside one of the receptacles 65 on each of the jaw locking plates 31 and 32, respectively.

The ends of the pins 60 adjacent the rear of sleeve 11 are supported suitably for rotation about their axes and with guide blocks 68 which are fixed to the sleeve 11 and which have slots for guiding the latch dogs 64 in their movement.

There are two such lock assemblies 60, as stated, so once both of the actuator lugs 62 are operated to rotate the shafts 61, there will be four lock dogs 64 in position, two of the dogs will be in the receptacles of each of the jaw locking plates 31 and 32. Once the lock dogs are in position, the adapter plate 19 and the jaw housing 14 can be rotated relative to the sleeve 11 and face plate 12 and the jaw actuator plates will be held from rotation relative to the sleeve 11 and which can be held with suitable levers or clamps, and the jaws 39 are actuated either inwardly or outwardly depending on the direction of rotation to clamp onto a workpiece when the chuck is mounted on a lathe. The face plate can be held stationary and the chuck powered to cause the threading or actuating of the jaws to clamp a workpiece.

The adapter plate 19 has a part annular recess 70 adjacent each of the lock dog assemblies and the relative rotation between sleeves 11 and the jaw locking plates and the jaw carrier is limited by the ends of these recesses.

The indexing rotation or movement of the jaw carrier member 24 about the axis of shafts 25 relative to the chuck housing 14, and, thus, the indexing of any workpiece held in the jaws 39, is controlled by an indexing control assembly indicated generally at 80 which includes an actuator shaft 81 rotatably mounted in the jaw carrier member 24 (see FIG. 4), and extending into a receptacle 82 on the interior of the jaw carrier member 24. The shaft 81 extends inwardly from the rear face or mounting adapter 19 and as shown in FIG. 3, the outer end of the shaft 81 extends through the adapter plate 19. The plate 19 has a recess 79 so the shaft does not protrude out beyond the rear surface of plate 19. A lever 81A is used for operating the shaft 81.

The shaft 81 has a latch plate 83 fixed to its inner end for rotation therewith, and the latch plate 83 is positioned in the receptacle 82. When the shaft 81 is rotated the latch plate 83 moves from a position where it is unlatched as shown in dotted lines in FIG. 3, to a latched position as shown in FIG. 4. The latched position places the latch plate 83 into a groove indicated at 85 in the periphery of the jaw carrier. The groove is a chordal groove at a position 90° from the pivot shafts 25, 25 so that the jaw carrier member 24 cannot pivot around these pivot shafts when the latch plate 83 is in the groove 85 as shown in FIG. 4. There is a second groove 86 in the jaw carrier 180° from the groove 85 in which latch plate 83 is positioned in FIG. 4. The latching will keep the axis of the workpiece precisely aligned for machining. The latch plate 83 is tapered or wedge shaped so that it will fit tightly into the groove 85 or 86 as it is moved to latched position, so that there is no play that would permit the jaw carrier to shift or move about its indexing axis formed by the shafts 25, 25. The wedge angle may be selected for proper operation and the wedge is formed to tighten as the shaft 81 is moved toward latched position.

Figure 2:
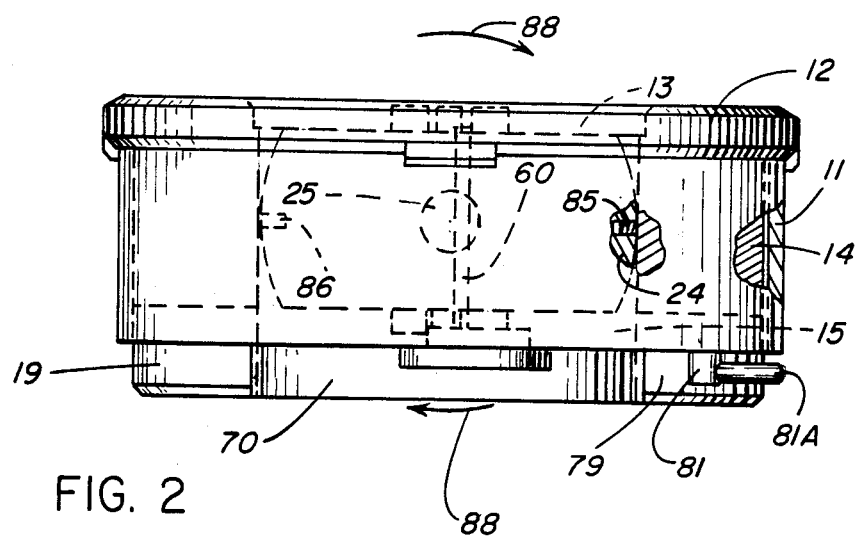
FIG. 2 is a bottom view of the chuck shown in FIG. 1, with parts in section and parts broken away.

The working position is with the dog latch plate 83 in position shown in FIG. 4, to hold the jaw carrier securely positioned in one or the other of its 180° indexed positions. The groove 86 on the opposite side of the jaw carrier member 24 from groove 85 is used when the latch plate 83 is moved to its dotted line position as shown in FIG. 3 clearing the jaw carrier member so it can rotate about the axis of the shafts 25, generally as shown by the arrow 88 in FIG. 2, 180° to position the workpiece end for end. Then the shaft 81 is rotated to move the latch plate 83 into groove 86 to hold the jaw carrier in its new position. The end of the workpiece that had been adjacent the rear of the chuck is now at the front face, and is available for machining the opposite end without removing the workpiece from the jaws. The workpiece of course cannot be longer than the diameter of the part spherical surface 26, because the workpiece must rotate within the openings 15 and 13 without any interference.

Thus, the operation of the chuck is easy. Mechanically tightening down the jaws is accomplished by operating the locking assemblies 60 to engage the lock dogs 64 into the receptacles 65 to hold the jaw locking plates 31 and 32 from rotation relative to the sleeve 11 and face plate 12. The sleeve 11 and face plate 12 (and the jaw locking plates 31 and 32) are then rotated while the mounting plate 19 and chuck housing 14, including the jaw carrier member 24 are held in a lathe. This causes relative rotation of jaw locking plates 31 and 32 relative to the jaw carrier member 24. The plates 31 and 32 are guided by cap screws 33. As this movement occurs the lugs 43 and 44, respectively of each jaw 39 move in the helical grooves 50 and 51, respectively, on the jaw locking plates to helically screw or move the jaws 39 tightly against a workpiece between the jaws, or, upon reversal, to loosen the jaws.

Three jaws are used, and because they will move evenly inwardly, they will exactly center the workpiece on the axis of rotation indicated at 41 for the chuck. It should be noted that the end surfaces of recess 70 limits the relative rotation of jaw locking plates because the actuator lugs 62 will abut the end surfaces of the recess 70. If necessary, the locking assemblies 60 can be released, the sleeve reversed to "reset" it or take a new bite, and then lock dogs 64, again engaged for further movement of jaws 39. Note also that the lower surfaces of actuator lug 62 acts as a stop for rotation of shaft 60 in either direction of rotation of the lug 62.

The latch 80 for the indexing operation is mechanical, easily made, and easily operated. When it is released, the jaw carrier member 24 can be rotated 180°, as stated, to position the workpiece at 180° indexed position from its initial position for working.

The shafts 60 preferably include a detent arrangement such as a detent ball or spring loaded drag that will hold the shafts 61 and actuator lugs 64 in either the in or the out position to insure safe operation. Holding the lugs 64 retracted is necessary for indexing movement of the jaw carrier member about the shafts 25.

Also, while a crank arm or lever 63 is shown for operating lugs 64 as shafts 61 rotate, other linkages may be used.

The chuck assembly is low cost, rugged, and easily manipulated and operated for indexing.

Although the present invention has been described with reference to preferred embodiments, workers skilled in the art will recognize that changes may be made in form and detail without departing from the spirit and scope of the invention.

What is claimed is:

1. An indexing chuck comprising a chuck housing, said chuck housing having a center bore therethrough, the axis of the bore comprising the turning axis, a jaw carrier mounted in said central bore, said jaw carrier having a pair of pivot pins, said pivot pins being mounted on said chuck housing for permitting rotation of said jaw carrier about a pin axis substantially perpendicular to the axis of the bore, a plurality of workpiece chucking jaws mounted in said jaw carrier and movable toward and away from axis of said bore, threadable means for moving the jaws inwardly and outwardly upon rotation of the threadable means about the axis of the bore, an outer housing rotatably mounted on the exterior of the chuck housing and rotatable relative to said chuck housing about the axis of the bore, means carried by the outer housing selectively movable to engage the threadable means and upon rotation of the outer housing operable for moving said jaws toward the axis of the bore to clamp a workpiece positioned along said axis, said means carried by the outer housing being movable to position clearing the periphery of the jaw carrier, and a mechanical latch plate movable from a latched position wherein it will prevent rotation of the jaw carrier about the axis of said pivot pins, to a position wherein it will clear said jaw carrier and permit said jaw carrier to be pivoted on said pivot pins, said jaw carrier having means for receiving said latch plate at 180° spaced positions to permit the jaw carrier to rotate 180° on said pivot pins.

2. The apparatus as specified in claim 1 wherein said means for actuating said jaws comprises at least one jaw locking plate adjacent one end of said jaw carrier, said plate being generally perpendicular to the axis of the bore and having a helical groove defined therein, and spiralled about the bore axis facing the jaw carrier and means on each of said jaws for engaging the groove whereby relative rotational movement between said jaw locking plate and said jaw carrier will cause said jaws to be moved inwardly or outwardly as controlled by the helical groove.

3. The apparatus as specified in claim 2 and a sleeve member mounted around said chuck housing, said sleeve member being relatively rotatable relative to said chuck housing, latch dog means mounted on said sleeve member for controlling the jaw locking plate, a receptacle formed on said jaw locking plate, means to selectively engage said latch dog with said receptacle whereby movement of said outer sleeve will cause the movement of said jaw actuating plate.

4. An indexing chuck comprising a chuck housing, means secured to the chuck housing to permit attaching the housing to a machine tool support, said chuck housing having a center bore therethrough, a jaw carrier mounted in said central bore, pivot means mounted on said chuck housing and supporting said jaw carrier in said bore for permitting rotation of said jaw carrier about a pivot indexing axis substantially perpendicular to the axis of the bore, a plurality of workpiece chucking jaws mounted in said jaw carrier and movable radially toward and away from the axis of said bore, at least one jaw locking plate mounted on a side of the chuck housing and having means cooperating with the jaws so that upon relative rotation between the chuck housing and the jaw locking plate the jaws may be moved radially inwardly or outwardly, latch means for selectively controlling rotation of the jaw carrier about the axis of said pivot pins, said jaw carrier being capable of being pivoted about said pivot pins 180°, and a sleeve member surrounding at least portions of said chuck housing, said sleeve member being relatively rotatable relative to said chuck housing, a latch dog mounted on said sleeve member, at least one receptacle formed in said jaw locking plate, and means to selectively engage said latch dog with said receptacle whereby relative rotational movement of said sleeve member and said chuck housing will cause movement of said jaw locking plate.

5. The apparatus as specified in claim 4 wherein said jaw locking plate has a helical groove defined therein and generated about the bore axis, and means on each of said jaws riding in said helical groove whereby relative rotation between said jaw locking plate and said jaw carrier will cause said jaws to be mechanically moved inwardly or outwardly.

6. The apparatus as specified in claim 4 and a sleeve member surrounding said chuck housing, said sleeve member being relatively rotatable relative to said chuck housing, a latch dog mounted on said sleeve member, a receptacle formed in said jaw locking plate, and means to selectively engage said latch dog with said receptacle whereby relative rotational movement of said outer sleeve and said chuck housing will cause the movement of said jaw actuating plate.

7. An indexing chuck having jaws capable of being turned end for end, said chuck comprising a chuck housing, said chuck housing having a center bore therethrough, the axis of the center bore comprising the workpiece turning axis of the chuck, a jaw carrier positioned within said center bore, pivot means connected between said jaw carrier and said chuck housing for permitting rotation of said jaw carrier about a pivot axis defined by the pivot means which is substantially perpendicular to the axis of the bore, said jaw carrier being pivotable substantially 180° about the pivot axis, a plurality of workpiece chucking jaws mounted on said jaw carrier and movable generally radially toward and away from the axis of said bore, a jaw locking plate adjacent at least one end of said jaw carrier, said plate being positioned generally perpendicular to the axis of the bore and having an actuating means defined in the surface thereof adjacent said jaw, said helical actuating means facing the jaw carrier, means on each of said jaws engaging the actuating means whereby relative rotational movement between said jaw locking plate and said jaw carrier will cause said jaws to each be moved inwardly or outwardly toward and away from said bore axis, an outer housing rotatably mounted relative to said chuck housing, and defining an opening to leave the bore unobstructed, said outer housing being rotatable about the bore axis, first latch means carried by said outer housing and selectively engagable with said jaw locking plate whereby in a first position said latch means will cause rotation of said jaw locking plate to thereby move said jaws whenever the outer housing is rotated relative to the chuck housing and in a second position the latch means clears the jaw locking plate, and a mechanical retainer latch plate separate from said first latch means movable from a latched position wherein it will prevent rotation of the jaw carrier about the pivot axis, to a position wherein the mechanical latch plate clears said jaw carrier and permits said jaw carrier to be pivoted about said pivot axis, said jaw carrier having means for receiving said latch plate at at least two positions spaced substantially 180° apart to permit the jaw carrier to rotate 180° about said pivot axis and to be latched in each of said rotational positions.

8. The apparatus as specified in claim 7 wherein the chuck housing has parallel end surfaces generally perpendicular to the axis of the bore, and a separate jaw locking plate mounted against each of the end surfaces of the chuck housing, the jaws having means at opposite ends thereof for engaging helical grooves on each of the jaw locking plates.

9. The apparatus of claim 8 wherein said jaw carrier has radially extending slots therein for each of said jaws, the means for engaging the helical grooves extending outwardly from opposite ends of the jaws beyond the respective end surfaces of the jaw carrier.

10. The apparatus of claim 7 wherein the jaw carrier has a receptacle therein opening to the central bore for receiving the latch plate, a shaft rotatably mounted in the chuck housing about an axis parallel to the axis of the bore, said latch plate being connected to the shaft and being operated by rotation of the shaft.

11. The apparatus of claim 10 wherein the first latch means for actuating the jaw locking plate comprises a second shaft rotatably mounted on the outer housing for controlling movement of the latch means, the first mentioned shaft and the second shaft both being accessible from a location of the jaw carrier which leaves the one end of the chuck housing free of protruding actuators.

* * * * *